United States Patent
Takahashi et al.

(10) Patent No.: US 8,619,664 B2
(45) Date of Patent: Dec. 31, 2013

(54) MOBILE COMMUNICATION SYSTEM

(75) Inventors: Hideaki Takahashi, Yokohama (JP); Wuri Andarmawanti Hapsari, Yokosuka (JP); Anil Umesh, Yokohama (JP); Mikio Iwamura, Tokyo (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 42 days.

(21) Appl. No.: 13/266,471

(22) PCT Filed: Apr. 23, 2010

(86) PCT No.: PCT/JP2010/057215
§ 371 (c)(1),
(2), (4) Date: Oct. 27, 2011

(87) PCT Pub. No.: WO2010/125973
PCT Pub. Date: Nov. 4, 2010

(65) Prior Publication Data
US 2012/0044860 A1    Feb. 23, 2012

(30) Foreign Application Priority Data

Apr. 27, 2009 (JP) ................. 2009-108559

(51) Int. Cl.
*H04B 7/14* (2006.01)
*H04W 72/08* (2009.01)

(52) U.S. Cl.
USPC ............ 370/315; 370/329; 370/437; 455/450

(58) Field of Classification Search
USPC .......... 370/328, 329, 330, 341, 338, 315, 252
See application file for complete search history.

(56) References Cited

U.S. PATENT DOCUMENTS

| 8,270,361 | B2* | 9/2012 | Yi et al. ................... 370/329 |
| 2010/0260098 | A1* | 10/2010 | Ulupinar et al. ............ 370/315 |
| 2010/0272006 | A1* | 10/2010 | Bertrand et al. ............ 370/315 |

OTHER PUBLICATIONS

CMCC, "Discussions on Functionality Partition of Relay in RAN2," 3GPP TSG-RAN WG2 Meeting #65bis, R2-092407, Mar. 23-27, 2009, 4 pages.
Panasonic, "Study Issues for Relay Nodes in RAN2," 3GPP TSG-RAN WG2 meeting #65_bis, R2-092393, Mar. 23-27, 2009, 5 pages.
3GPP TS 36.401 V8.5.0, Mar. 2009, "3rd Generation Partnership Project; Technical Specification Group Radio Access Network; Evolved Universal Terrestrial Radio Access Network (E-UTRAN); Architecture description (Release 8)," 19 pages.

(Continued)

*Primary Examiner* — Candal Elpenord
(74) *Attorney, Agent, or Firm* — Osha Liang LLP

(57) ABSTRACT

A radio base station includes a mobile communication system configured to transmit and receive a data signal between a mobile station and a gateway device via a relay node and a radio base station. The mobile communication system is configured such that the radio bearer for the mobile station is set between the mobile station and the relay node. The radio bearer for the relay node is set between the relay node and the radio base station. A network bearer for the mobile station is set between the relay node and the gateway device. The network bearer for a plurality of mobile stations is multiplexed in the radio bearer for the relay node, and a data signal is transmitted and received between the mobile station and the gateway device via the radio bearer for the mobile station and the network bearer for the mobile station.

2 Claims, 7 Drawing Sheets

(56) References Cited

OTHER PUBLICATIONS

3GPP TS 36.410 V8.2.0, Mar. 2009, "3rd Generation Partnership Project; Technical Specification Group Radio Access Network; Evolved Universal Terrestrial Radio Access Network (E-UTRAN); S1 General aspects and principles (Release 8)," 14 pages.

3GPP TS 36.300 V8.8.0, Mar. 2009, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 157 pages.

International Search Report issued in PCT/JP2010/057215, mailed on Aug. 3, 2010, with translation, 3 pages.

Written Opinion issued in PCT/JP2010/057215, mailed on Aug. 3, 2010, 4 pages.

Office Action for Mexican Application No. MX/a/2011/011386 dated Aug. 14, 2012, with English translation thereof (5 pages).

Extended European Search Report in corresponding European application No. 10769672.6 dated Jun. 10, 2013 (5 pages).

Catt; "EPS Bearer Context Synchronization during the S1 Release Procedure"; 3GPP TSG SA WG2 Meeting #67, S2-086051; Sophia Antipolis, France; Aug. 25-29, 2008 (3 pages).

\* cited by examiner

MOBILE COMMUNICATION SYSTEM

BACKGROUND OF INVENTION

1. Technical Field

The present invention relates to a mobile communication system.

2. Background Art

FIG. 7 illustrates a transmission bearer configuration and a protocol stack for a U plane PDU (Protocol Data Unit) provided between a mobile station UE and a gateway device S-GW in an LTE scheme (Release. 8) standardized in 3GPP.

As illustrated in FIG. 7, the bearer is an EPS (Evolved Packet System) radio bearer for the mobile station UE provided between the mobile station UE and the radio base station eNB, and an S1 bearer for the mobile station UE provided between the gateway device S-GW and the radio base station eNB.

As illustrated in FIG. 7, the U plane PDU (data signal) is configured to be transmitted/received between the gateway device S-GW and the mobile station UE on the EPS bearer (E-RAB) for the mobile station UE configured by the S1 bearer and the EPS radio bearer for the mobile station UE.

The mobile station UE is provided with radio bearer functions configured to set the EPS radio bearer for the mobile station UE with the radio base station eNB including a physical (PHY) layer function, an MAC (Media Access Control) layer function, an RLC (Radio Link Control) layer function, and a PDCP (Packet Data Convergence Protocol) layer function.

The radio base station eNB is provided with radio bearer functions configured to set the EPS radio bearer for the mobile station UE with the mobile station UE including a physical (PHY) layer function, an MAC layer function, an RLC layer function, and a PDCP layer function.

The radio base station eNB further includes S1 bearer functions configured to set the S1 bearer for the mobile station UE with the gateway device S-GW including a network 1/2 (NW L1/L2) function, an IP (Internet Protocol) layer function, a UDP (User Datagram Protocol) layer function, and a GTP (GPRS Tunneling Protocol)-U layer function.

Similarly, the gateway device S-GW is provided with S1 bearer functions configured to set the S1 bearer for the mobile station UE with the radio base station eNB including a network 1/2 (NW L1/L2) function, an IP layer function, a UDP layer function, and a GTP-U layer function.

In an LTE-advanced mobile communication system that is a next-generation communication scheme for an LTE scheme, a "relay node (RN)" including the same functions as the radio base station eNB can be connected between the mobile station UE and the radio base station eNB.

However, in a conventional mobile communication system, the mobile station UE is not adapted to execute transmitting/receiving a U plane PDU with the gateway device S-GW via one or a plurality of radio relay stations (an apparatus including a function of relaying a U plane PDU that is received via a radio bearer). Consequently, when a relay node RN including a radio relay station function is employed, application is not enabled for a protocol stack and a transmission bearer configuration for the U plane PDU as described above.

SUMMARY OF INVENTION

One or more embodiments of the present invention may provide a mobile communication system in which the mobile station enables transmitting/receiving of a data signal with a gateway device via one or a plurality of radio relay stations.

The first feature of the present invention is summarized in that a mobile communication system configured to transmit and receive a data signal between a mobile station and a gateway device via a relay node and a radio base station, wherein the mobile communication system is configured such that the radio bearer for the mobile station is set between the mobile station and the relay node, the radio bearer for the relay node is set between the relay node and the radio base station, a network bearer for the mobile station is set between the relay node and the gateway device, the network bearer for a plurality of mobile stations is multiplexed in the radio bearer for the relay node; and a data signal is transmitted and received between the mobile station and the gateway device via the radio bearer for the mobile station and the network bearer for the mobile station.

The second feature of the present invention is summarized in that a mobile communication system configured to transmit and receive a data signal between a mobile station and a gateway device via a relay node and a radio base station, wherein the mobile communication system is configured such that the radio bearer for the mobile station is set between the mobile station and the relay node the radio bearer for the relay node is set between the relay node and the radio base station a network bearer for the mobile station is set between the relay node and the gateway device the network bearer for the relay node is set between the radio base station and the gateway device a bearer for a plurality of mobile stations is multiplexed in the radio bearer for the relay node and the network bearer for the relay node and a data signal is transmitted and received between the mobile station and the gateway device via the radio bearer for the mobile station and the network bearer for the mobile station.

The third feature of the present invention is summarized in that a mobile communication system configured to transmit and receive a data signal between a mobile station and a gateway device via a relay node and a radio base station, wherein the mobile communication system is configured such that the radio bearer for the mobile station is set between the mobile station and the relay node the radio bearer for the relay node is set between the relay node and the radio base station a network bearer for the mobile station is set between the radio base station and the gateway device the network bearer for the relay node is set between the radio base station and the gateway device the radio bearer for the relay node is set independently for each mobile station the network bearer for a plurality of mobile stations is multiplexed in the network bearer for the relay node and a data signal is transmitted and received between the mobile station and the gateway device via the radio bearer for the mobile station, the radio bearer for the relay node set as for the mobile station, and the network bearer for the mobile station.

The fourth feature of the present invention is summarized in that a mobile communication system configured to transmit and receive a data signal between a mobile station and a gateway device via a relay node and a radio base station, wherein the mobile communication system is configured such that the radio bearer for the mobile station is set between the mobile station and the relay node the radio bearer for the relay node is set between the relay node and the radio base station the network bearer for the mobile station is set between the relay node and the radio base station the network bearer for a plurality of mobile stations is multiplexed in the radio bearer for the relay node the network bearer for the relay node is set between the radio base station and the gateway device the network bearer for the relay node is set independently for each mobile station and a data signal is transmitted and received between the mobile station and the gateway device via the radio bearer for the mobile station, the network bearer for the mobile station, and the network bearer for the relay node set as for the mobile station.

The fifth feature of the present invention is summarized in that a mobile communication system configured to transmit and receive a data signal between a mobile station and a gateway device via a relay node and a radio base station, wherein the radio bearer for the mobile station is set between the mobile station and the relay node the radio bearer for the relay node is set between the relay node and the radio base station the network bearer for the relay node is set between the radio base station and the gateway device the radio bearer for the relay node is set independently for each mobile station the network bearer for the relay node is set independently for each mobile station and a data signal is transmitted and received between the mobile station and the gateway device via the radio bearer for the mobile station, the radio bearer for the relay node set as for the mobile station, and the network bearer for the relay node set as for the mobile station.

As has been described above, according to the present invention, it is possible to provide a mobile communication system in which the mobile station enables transmitting/receiving of a data signal with a gateway device via one or a plurality of radio relay stations.

DETAILED DESCRIPTION (Mobile Communication System according to First Embodiment of Present Invention) In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention.

A mobile communication system according to the first embodiment of the present invention will be described with reference to FIG. 1 and FIG. 2.

Figure 1:
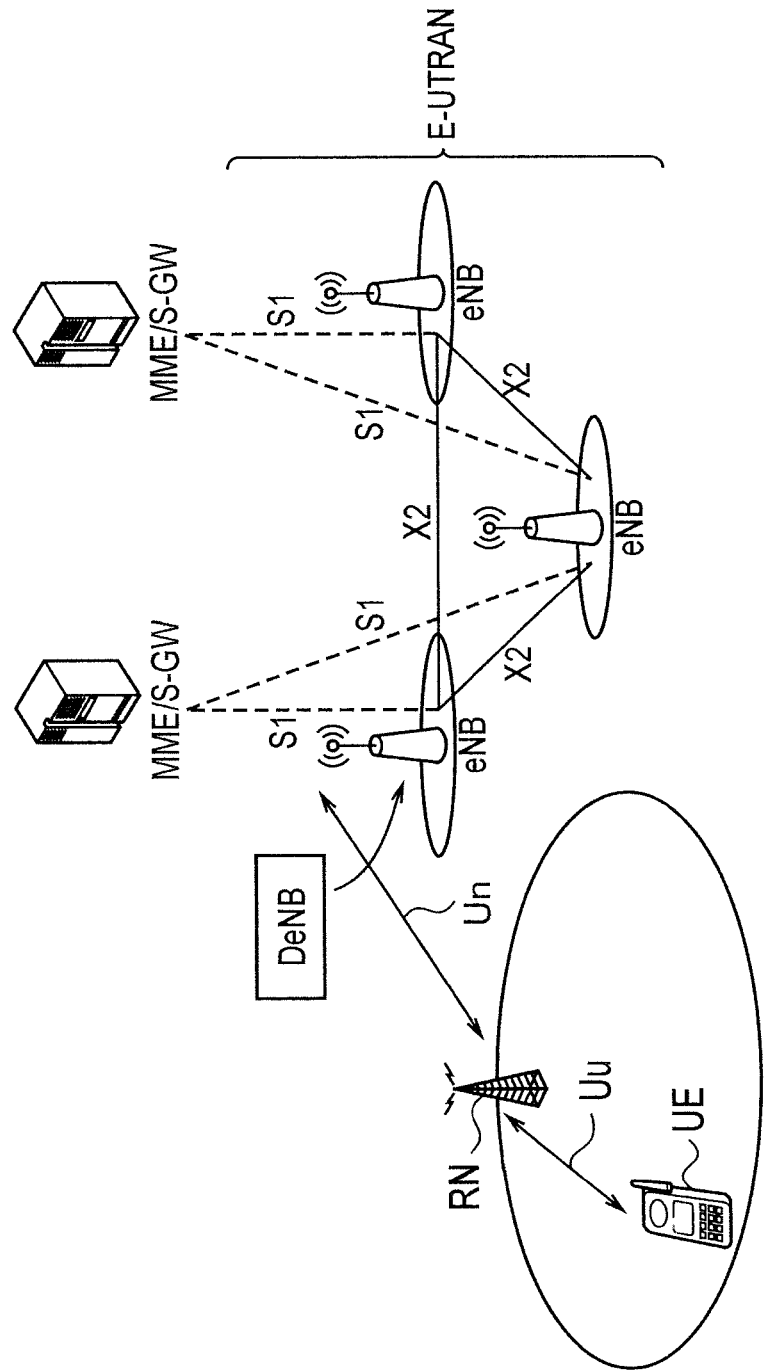
FIG. 1 is a diagram showing the entire configuration of a mobile communication system according to a first embodiment of the present invention.

As illustrated in FIG. 1, the mobile communication system according to the present embodiment is a mobile communication system applying an LTE-advanced scheme, and includes a mobile switching center (MME), a gateway device S-GW, a radio base station eNB, and a relay node (RN) (radio relay station).

As illustrated in FIG. 1, the mobile switching center MME and the gateway device S-GW can be connected via an S1 interface with the radio base station eNB. Radio base stations eNB can be connected via an X2 interface. The radio base station eNB can be connected via a Un interface with the relay node RN, and the relay node can be connected via a Uu interface with the mobile station UE.

The radio base station connected with the relay node may be termed the "DeBN (Donor eNB)".

Figure 2:
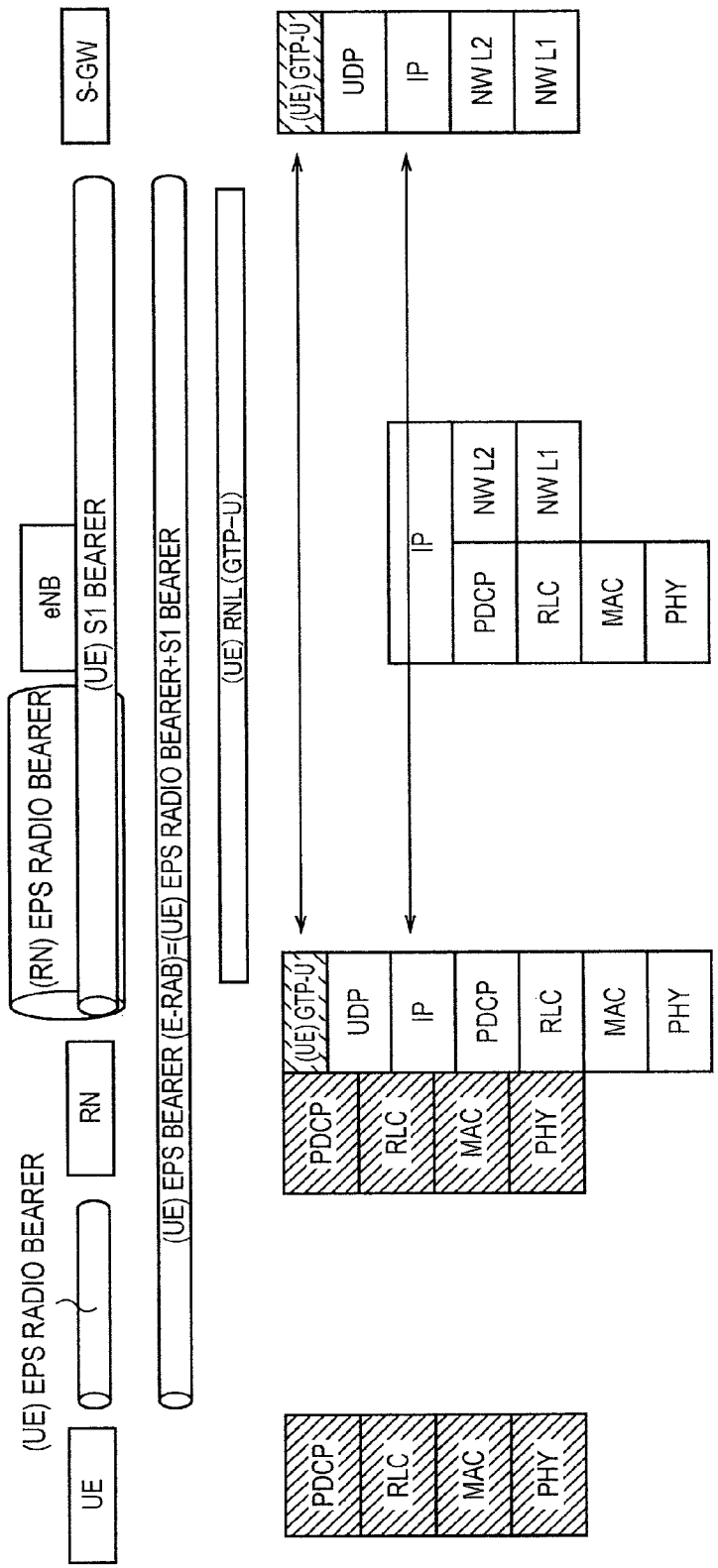
FIG. 2 illustrates a protocol stack in the mobile communication system according to the first embodiment of the present invention.

As illustrated in FIG. 2, the mobile communication system according to the present embodiment is configured so that transmitting and receiving of a data signal is enabled via a relay node RN and a radio base station eNB (DeNB) between a mobile station UE and a gateway device S-GW.

The mobile communication system according to the present embodiment is configured to set an EPS radio bearer for the mobile station UE "(UE) EPS radio bearer (radio bearer)" between the mobile station UE and the relay node RN.

The mobile communication system according to the present embodiment is configured to set an EPS radio bearer for the relay node RN "(RN) EPS radio bearer" between the radio base station eNB and the relay node RN.

The mobile communication system according to the present embodiment is configured to set an S1 bearer for the mobile station UE "(UE) S1 bearer (network bearer)" between the gateway device S-GW and the relay node RN.

The mobile communication system according to the present embodiment is configured not to provide an S1 bearer for the relay node RN "(RN) S1 radio bearer".

The mobile communication system according to the present embodiment is configured to multiplex an S1 bearer for a plurality of mobile stations "(UE) S1 bearer" in the EPS radio bearer for the relay node R1.

As a result, the mobile communication system according to the present embodiment is configured so that a data signal is transmitted/received between the gateway device S-GW and the mobile station UE via the EPS bearer for the mobile station UE (E-RAB) "(UE) EPS bearer" configured by the EPS radio bearer for the mobile station UE "(UE) EPS radio bearer" and the S1 bearer for the mobile station UE "(UE) S1 bearer".

The mobile station UE is provided with EPS radio bearer functions configured to set the EPS radio bearer for the mobile station UE "(UE) EPS radio bearer" with the relay node RN and includes a physical (PHY) layer function, an MAC layer function provided as a higher layer function to the physical (PHY) layer function, an RLC layer function provided as a higher layer function to the MAC layer function, and a PDCP layer function provided as a higher layer function to the RLC layer function.

The relay node RN is provided with an EPS radio bearer function for the mobile station UE configured to set the EPS radio bearer for the mobile station UE "(UE) EPS radio bearer" with the mobile station UE including a physical (PHY) layer function, an MAC layer function provided as a higher layer function to the physical (PHY) layer function, an RLC layer function provided as a higher layer function to the MAC layer function, and a PDCP layer function provided as a higher layer function to the RLC layer function.

The relay node RN includes an EPS radio bearer function for the relay node RN configured to set the EPS radio bearer for the relay node RN "(RN) EPS radio bearer" with the radio base station eNB, an IP layer function provided as a higher layer function to the EPS radio bearer function, a UDP layer function provided as a higher layer function to the IP layer function, and a (UE) GTP-U layer function provided as a higher layer function to the UDP layer function.

The relay node RN is provided with EPS radio bearer functions for the relay node RN including a physical (PHY) layer function, an MAC layer function provided as a higher layer function to the physical (PHY) layer function, an RLC layer function provided as a higher layer function to the MAC layer function, and a PDCP layer function provided as a higher layer function to the RLC layer function.

The (UE) GTP-U layer function of the relay node RN is an S1 bearer function for the mobile station UE configured to set an S1 bearer for the mobile station UE "(UE) S1 bearer" with the gateway device S-GW.

The radio base station eNB includes an EPS radio bearer function for the relay node RN of setting the EPS radio bearer for the relay node RN "(RN) S1 bearer" with the relay node RN, a wired bearer function configured to set a wired bearer with the gateway device S-GW, and an IP layer function provided as a higher layer function to the EPS radio bearer function for the relay node RN and the wired bearer function.

The radio base station eNB is provided with EPS radio bearer functions for the relay node RN including a physical (PHY) layer function, an MAC layer function provided as a higher layer function to the physical (PHY) layer function, an RLC layer function provided as a higher layer function to the MAC layer function, and a PDCP layer function provided as a higher layer function to the RLC layer function.

The radio base station eNB is provided with a wired bearer function including a network layer 1/2 (NW L1/L2) function.

The radio base station eNB is provided with a higher layer function to the EPS radio bearer function for the relay node RN and wired bearer function including an IP layer function.

The gateway device S-GW includes a wired bearer function configured to set a wired bearer with the radio base station eNB, an IP layer function provided as a higher layer function to the wired bearer function, a UDP layer function provided as a higher layer function to the IP layer function, and a (UE) GTP-U layer function provided as a higher layer function to the UDP layer function.

The gateway device S-GW is provided with a wired bearer function including a network layer 1/2 (NW L1/L2) function.

The (UE) GTP-U layer function for the gateway device S-GW is an S1 bearer function for the mobile station UE configured to set an S1 bearer for the mobile station UE "(UE) S1 bearer" with the relay node RN.

The relay node RN is configured to manage the correspondence relationship between the "RB-ID" that identifies the EPS radio bearer for the mobile station UE "(UE) EPS radio bearer" and the "GTP-U TEID" that identifies the S1 bearer for the mobile station UE "(UE) S1 bearer", and to enable conversion of both components.

The mobile communication system according to the present embodiment realizes a configuration in which the mobile station is enabled to transmit/receive a data signal with the gateway device S-GW via an apparatus provided with a plurality of radio base station eNB functions (a relay node RN and a radio base station eNB) without executing a large modification of the protocol stack used in an LTE-scheme mobile communication system.

The mobile communication system according to the present embodiment enables a reduction in the overhead in an interval since an S1 bearer for the relay node RN is not provided between the gateway device S-GW and the radio base station eNB.

The mobile communication system according to the present embodiment does not require to set the radio bearers to correspond to the number of mobile stations UE between the radio base station eNB and the relay node RN.

(Mobile Communication System according to Second Embodiment of Present Invention)

A mobile communication system according to the second embodiment of the present invention will be described with reference to FIG. 3. Hereinafter, the description of the mobile communication system according to the second embodiment of the present invention will concentrate on the points of difference from the mobile communication system according to the first embodiment described above.

Figure 3:
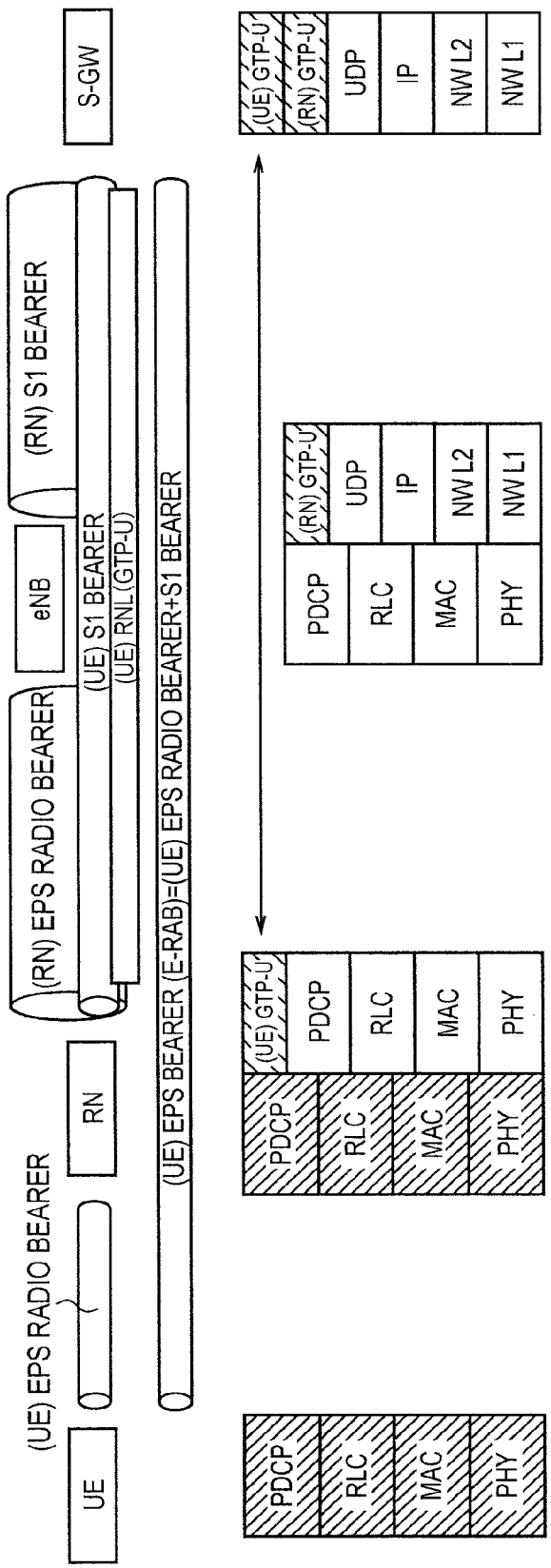
FIG. 3 illustrates a protocol stack in the mobile communication system according to a second embodiment of the present invention.

As illustrated in FIG. 3, the mobile communication system according to the present embodiment is configured so that transmitting and receiving of a data signal is enabled via a relay node RN and a radio base station eNB (DeNB) between a mobile station UE and a gateway device S-GW.

The mobile communication system according to the present embodiment is configured to set an EPS radio bearer for the mobile station UE "(UE) EPS radio bearer" between the mobile station UE and the relay node RN.

The mobile communication system according to the present embodiment is configured to set an EPS radio bearer for the relay node RN "(RN) EPS radio bearer" between the radio base station eNB and the relay node RN.

The mobile communication system according to the present embodiment is configured to set an S1 bearer for the mobile station UE "(UE) S1 bearer" between the gateway device S-GW and the relay node RN.

The mobile communication system according to the present embodiment is configured to set an S1 bearer for the relay node RN "(RN) S1 bearer" between the gateway device S-GW and the radio base station eNB.

The mobile communication system according to the present embodiment is configured to multiplex an S1 bearer "(UE) S1 bearer" for a plurality of mobile stations in the radio bearer for the relay node RN "(RN) EPS radio bearer" and the S1 bearer for the relay node RN "(RN) S1 bearer".

As a result, the mobile communication system according to the present embodiment is configured so that a data signal is transmitted/received between the gateway device S-GW and the mobile station UE via the EPS bearer for the mobile station UE (E-RAB) "(UE) EPS bearer" configured by the EPS radio bearer for the mobile station UE "(UE) EPS radio bearer" and the S1 bearer for the mobile station UE "(UE) S1 bearer".

As illustrated in FIG. 3, the relay node RN includes an EPS radio bearer function for the mobile station UE configured to set an EPS radio bearer for the mobile station UE "(UE) EPS radio bearer" with the mobile station UE, a radio bearer function for the relay node RN configured to set an EPS radio bearer for the relay node RN "(RN) EPS radio bearer" with the radio base station eNB, and a (UE) GTP-U layer function provided as a higher layer function to the radio bearer function for the relay node RN.

The relay node RN is provided with EPS radio bearer functions for the mobile station UE including a physical (PHY) layer function, an MAC layer function provided as a higher layer function to the physical (PHY) layer function, an RLC layer function provided as a higher layer function to the MAC layer function, and a PDCP layer function provided as a higher layer function to the RLC layer function.

The relay node RN is provided with EPS radio bearer functions for the relay node RN including a physical (PHY) layer function, an MAC layer function provided as a higher layer function to the physical (PHY) layer function, an RLC layer function provided as a higher layer function to the MAC layer function, and a PDCP layer function provided as a higher layer function to the RLC layer function.

The (UE) GTP-U layer function of the relay node RN is an S1 bearer function for the mobile station UE configured to set an S1 bearer for the mobile station UE "(UE) S1 bearer" with the gateway device S-GW.

The radio base station eNB includes a radio bearer function for the relay node RN configured to set the EPS radio bearer for the relay node RN "(RN) EPS radio bearer" with the relay node RN, a wired bearer function configured to set a wired bearer with the gateway device S-GW, an IP layer function provided as a higher layer function to the wired bearer function, a UDP layer function provided as a higher layer function to the IP layer function, and an (RN) GTP-U layer provided as a higher layer function to the UDP layer function.

The radio base station eNB is provided with EPS radio bearer functions for the relay node RN including a physical (PHY) layer function, an MAC layer function provided as a higher layer function to the physical (PHY) layer function, an RLC layer function provided as a higher layer function to the MAC layer function, and a PDCP layer function provided as a higher layer function to the RLC layer function.

The radio base station eNB is provided with a wired bearer function including a network layer 1/2 (NW L1/L2) function.

The (RN) GTP-U layer function for the radio base station eNB is an S1 bearer function for the relay node RN configured to set an S1 bearer for the relay node RN "(RN) S1 bearer" with the relay node RN.

The gateway device S-GW includes a wired bearer function configured to set a wired bearer with the radio base station eNB, an IP layer function provided as a higher layer function to the wired bearer function, a UDP layer function provided as a higher layer function to the IP layer function, an (RN) GTP-U layer function provided as a higher layer function to the UDP layer function, and a (UE) GTP-U layer function provided as a higher layer function to the (RN) GTP-U layer function.

The gateway device S-GW is provided with a wired bearer function including a network layer 1/2 (NW L1/L2) function.

The (RN) GTP-U layer function for the gateway device S-GW is an S1 bearer function for the relay node RN configured to set an S1 bearer for the relay node RN "(RN) S1 bearer" with the radio base station eNB.

The (UE) GTP-U layer function for the gateway device S-GW is an S1 bearer function for the mobile station UE configured to set an S1 bearer for the mobile station UE "(UE) S1 bearer" with the relay node RN.

The mobile communication system according to the present embodiment realizes a configuration in which the mobile station is enabled to transmit/receive a data signal with the gateway device S-GW via an apparatus provided with a plurality of radio base station eNB functions (a relay node RN and a radio base station eNB) without executing a large modification of the protocol stack used in an LTE-scheme mobile communication system.

The mobile communication system according to the present embodiment does not require to set the radio bearers to correspond to the number of mobile stations UE between the radio base station eNB and the relay node RN, and between the radio base station eNB and the gateway device S-GW.

(Mobile Communication System according to Third Embodiment of Present Invention)

A mobile communication system according to the third embodiment of the present invention will be described with reference to FIG. 4. Hereinafter, the description of the mobile communication system according to the third embodiment of the present invention will concentrate on the points of difference from the mobile communication system according to the first embodiment described above.

Figure 4:
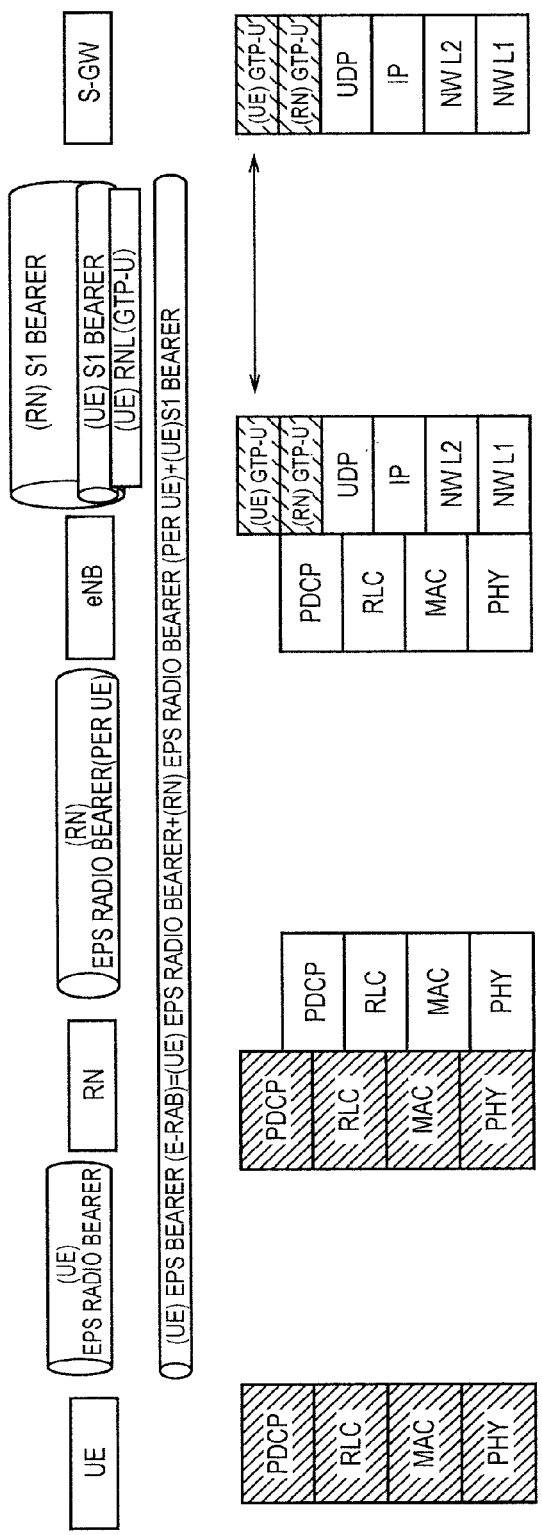
FIG. 4 illustrates a protocol stack in the mobile communication system according to a third embodiment of the present invention.

As illustrated in FIG. 4, the mobile communication system according to the present embodiment is configured so that transmitting and receiving of a data signal between a mobile station UE and a gateway device S-GW is enabled via a relay node RN and a radio base station eNB.

The mobile communication system according to the present embodiment is configured to set an EPS radio bearer for the mobile station UE "(UE) EPS radio bearer" between the mobile station UE and the relay node RN.

The mobile communication system according to the present embodiment is configured to set an EPS radio bearer for the relay node RN "(RN) EPS radio bearer (per UE)" independently for each mobile station between the radio base station eNB and the relay node RN.

The mobile communication system according to the present embodiment is configured to set an S1 bearer for the mobile station UE "(UE) S1 bearer" between the gateway device S-GW and the radio base station eNB.

The mobile communication system according to the present embodiment is configured to set an S1 bearer for the relay node RN "(RN) S1 bearer" between the gateway device S-GW and the radio base station eNB.

The mobile communication system according to the present embodiment is configured to multiplex an S1 bearer "(UE) S1 bearer" for a plurality of mobile stations in the S1 bearer for the relay node RN "(RN) S1 bearer".

As a result, the mobile communication system according to the present embodiment is configured so that data signals are transmitted/received between the gateway device S-GW and the mobile station UE via the EPS bearer for the mobile station UE (E-RAB) "(UE) EPS bearer" that is configured by the EPS radio bearer for the mobile-station UE "(UE) EPS radio bearer", the EPS radio bearer for the relay node RN "(RN) EPS radio bearer (per UE)" set as for the mobile station UE, and the S1 bearer for the mobile station UE "(UE) S1 bearer".

As illustrated in FIG. 4, the relay node RN includes an EPS radio bearer function for the mobile station UE configured to set an EPS radio bearer for the mobile station UE "(UE) EPS bearer" with the mobile station UE, and an EPS radio bearer function for the relay node RN configured to set an EPS radio bearer for the relay node RN "(RN) EPS radio bearer (per UE)" independently for each mobile station with the radio base station eNB.

The relay node RN is provided with EPS radio bearer function for the mobile station UE including a physical (PHY) layer function, an MAC layer function provided as a higher layer function to the physical (PHY) layer function, an RLC layer function provided as a higher layer function to the MAC layer function, and a PDCP layer function provided as a higher layer function to the RLC layer function.

The relay node RN is provided with EPS radio bearer functions for the relay node RN including a physical (PHY) layer function, an MAC layer function provided as a higher layer function to the physical (PHY) layer function, an RLC layer function provided as a higher layer function to the MAC layer function, and a PDCP layer function provided as a higher layer function to the RLC layer function.

The radio base station eNB includes an EPS radio bearer function for the relay node RN configured to set the EPS radio bearer for the relay node RN "(RN) EPS radio bearer (per UE)" independently for each mobile station with the relay node RN, a wired bearer function configured to set a wired bearer with the gateway device S-GW, an IP layer function provided as a higher layer function to the wired bearer function, a UDP layer function provided as a higher layer function to the IP layer function, an (RN) GTP-U layer function provided as a higher layer function to the UDP layer function, and a (UE) GTP-U layer function provided as a higher layer function to the (RN) GTP-U layer function.

The radio base station eNB is provided with EPS radio bearer functions for the relay node RN including a physical (PHY) layer function, an MAC layer function provided as a higher layer function to the physical (PHY) layer function, an RLC layer function provided as a higher layer function to the MAC layer function, and a PDCP layer function provided as a higher layer function to the RLC layer function.

The radio base station eNB is provided with a wired bearer function including a network layer 1/2 (NW L1/L2) function.

The (RN) GTP-U layer function for the radio base station eNB is an S1 bearer function for the relay node RN configured to set an S1 bearer for the relay node RN "(RN) S1 bearer" with the gateway device S-GW.

The (UE) GTP-U layer function for the radio base station eNB is an S1 bearer function for the mobile station UE configured to set an S1 bearer for the mobile station UE "(UE) S1 bearer" with the gateway device S-GW.

The gateway device S-GW includes a wired bearer function configured to set a wired bearer with the radio base station eNB, an IP layer function provided as a higher layer function to the wired bearer function, a UDP layer function provided as a higher layer function to the IP layer function, an (RN) GTP-U layer function provided as a higher layer function to the UDP layer function, and a (UE) GTP-U layer function provided as a higher layer function to the (RN) GTP-U layer function.

The gateway device S-GW is provided with a wired bearer function including a network layer 1/2 (NW L1/L2) function.

The (RN) GTP-U layer function for the gateway device S-GW is an S1 bearer function for the relay node RN configured to set an S1 bearer for the relay node RN "(RN) S1 bearer" with the radio base station eNB.

The (UE) GTP-U layer function for the gateway device S-GW is an S1 bearer function for the mobile station UE configured to set an S1 bearer for the mobile station UE "(UE) S1 bearer" with the radio base station eNB.

The mobile communication system according to the present embodiment realizes a configuration in which the mobile station is enabled to transmit/receive a data signal with the gateway device S-GW via an apparatus provided with a plurality of radio base station eNB functions (a relay node RN and a radio base station eNB) without executing a large modification of the protocol stack used in an LTE-scheme mobile communication system.

The mobile communication system according to the present embodiment enables a reduction in the overhead between the relay node RN and the radio base station eNB.

The mobile communication system according to the present embodiment does not require to set the wired bearers to correspond to the number of mobile stations UE between the radio base station eNB and gateway device S-GW.

The mobile communication system according to the present embodiment enables performance of QoS control for each mobile station between the relay node RN and the radio base station eNB.

(Mobile Communication System according to Fourth Embodiment of Present Invention)

A mobile communication system according to the fourth embodiment of the present invention will be described with reference to FIG. 5. Hereinafter, the description of the mobile communication system according to the fourth embodiment of the present invention will concentrate on the points of difference from the mobile communication system according to the first embodiment described above.

Figure 5:
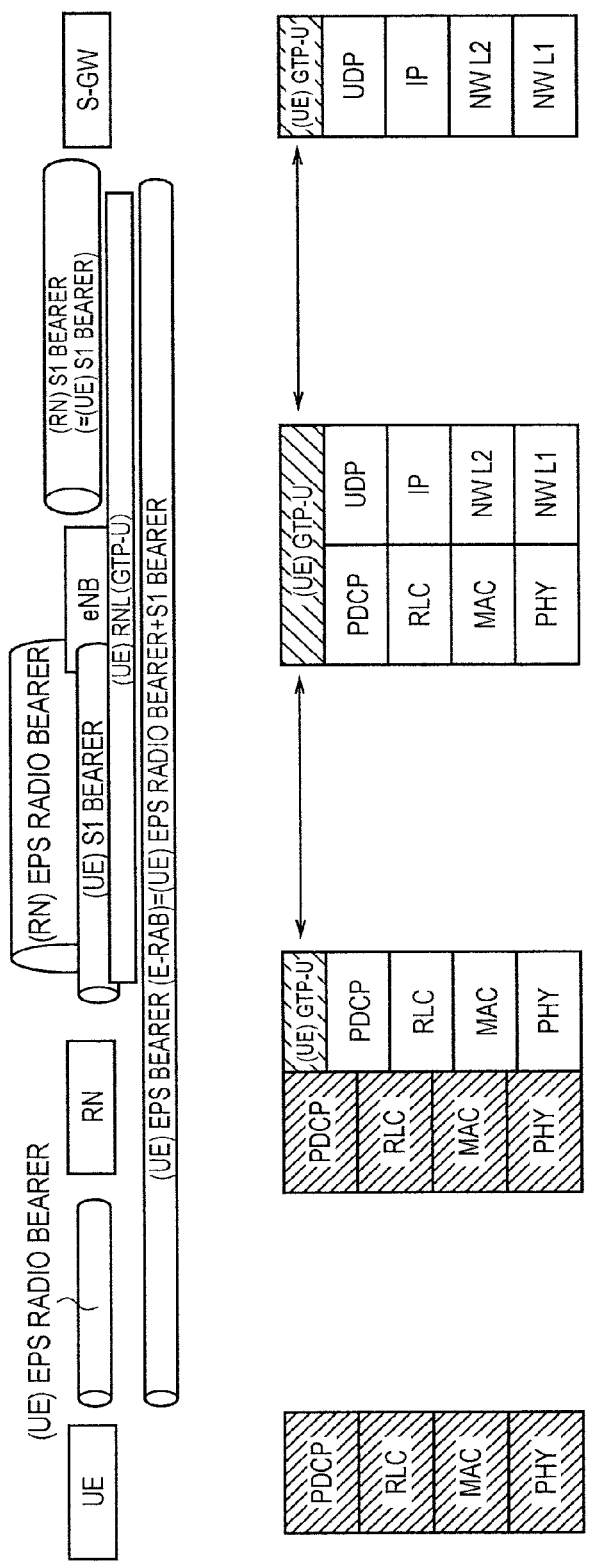
FIG. 5 illustrates a protocol stack in the mobile communication system according to a fourth embodiment of the present invention.

As illustrated in FIG. 5, the mobile communication system according to the present embodiment is configured so that transmitting and receiving of a data signal between a mobile station UE and a gateway device S-GW is enabled via a relay node RN and a radio base station eNB.

The mobile communication system according to the present embodiment is configured to set an EPS radio bearer for the mobile station UE "(UE) EPS radio bearer" between the mobile station UE and the relay node RN.

The mobile communication system according to the present embodiment is configured to set an EPS radio bearer for the relay node RN "(RN) EPS radio bearer" between the radio base station eNB and the relay node RN.

The mobile communication system according to the present embodiment is configured to set an S1 bearer for the mobile station UE "(UE) S1 bearer" between the relay node RN and the radio base station eNB.

The mobile communication system according to the present embodiment is configured to set an S1 bearer for the relay node RN "(RN) S1 bearer (=(UE) S1 bearer)" independently for each mobile station between the gateway device S-GW and the radio base station eNB.

As a result, the mobile communication system according to the present embodiment is configured so that data signals are transmitted/received between the gateway device S-GW and the mobile station UE via the S1 bearer for the relay node RN "(RN) S1 bearer (=(UE) S1 bearer)", the S1 bearer for the mobile station UE "(UE) S1 bearer", and the radio bearer for the mobile station UE "(UE) EPS radio bearer".

As illustrated in FIG. 5, the relay node RN includes an EPS radio bearer function for the mobile station UE configured to set an EPS radio bearer for the mobile station UE "(UE) EPS bearer" with the mobile station UE, an EPS radio bearer function for the relay node RN configured to set an EPS radio bearer for the relay node RN "(RN) EPS radio bearer" with the radio base station eNB, and a (UE) GTP-U layer function provided as a higher layer function to the EPS radio bearer function for the relay node RN.

The relay node RN is provided with EPS radio bearer functions for the mobile station UE including a physical (PHY) layer function, an MAC layer function provided as a higher layer function to the physical (PHY) layer function, an RLC layer function provided as a higher layer function to the MAC layer function, and a PDCP layer function provided as a higher layer function to the RLC layer function.

The relay node RN is provided with EPS radio bearer functions for the relay node RN including a physical (PHY) layer function, an MAC layer function provided as a higher layer function to the physical (PHY) layer function, an RLC layer function provided as a higher layer function to the MAC layer function, and a PDCP layer function provided as a higher layer function to the RLC layer function.

The (UE) GTP-U layer function of the relay node RN is an S1 bearer function for the mobile station UE configured to set the S1 bearer for the mobile station UE "(UE) S1 bearer" with the radio base station eNB.

The radio base station eNB includes an EPS radio bearer function for the relay node RN configured to set the EPS radio bearer for the relay node RN "(RN) EPS radio bearer" with the relay node RN, a wired bearer function configured to set a wired bearer with the gateway device S-GW, an IP layer function provided as a higher layer function to the wired bearer function, a UDP layer function provided as a higher layer function to the IP layer function, and a (UE) GTP-U layer function provided as a higher layer function to the EPS radio bearer function for the relay node RN and the UDP layer function.

The radio base station eNB is provided with EPS radio bearer functions for the relay node RN including a physical (PHY) layer function, an MAC layer function provided as a higher layer function to the physical (PHY) layer function, an RLC layer function provided as a higher layer function to the MAC layer function, and a PDCP layer function provided as a higher layer function to the RLC layer function.

The radio base station eNB is provided with a wired bearer function including a network layer 1/2 (NW L1/L2) function.

The (UE) GTP-U layer function for the radio base station eNB is an S1 bearer function for the mobile station UE configured to set an S1 bearer for the mobile station UE "(UE) S1 bearer" with the relay node RN.

The (UE) GTP-U layer function of the radio base station eNB is an S1 bearer function for the mobile station UE (or an S1 bearer function for the relay node RN) configured to set an S1 bearer for the mobile station UE (S1 bearer for the relay node RN) "(UE) S1 bearer (=(RN) S1 bearer)" with the gateway device S-GW.

The gateway device S-GW includes a wired bearer function configured to set a wired bearer with the radio base station eNB, an IP layer function provided as a higher layer function to the wired bearer function, a UDP layer function provided as a higher layer function to the IP layer function, and a (UE) GTP-U layer function provided as a higher layer function to the UDP layer function.

The gateway device S-GW is provided with a wired bearer function including a network layer 1/2 (NW L1/L2) function.

The (UE) GTP-U layer function for the gateway device S-GW is an S1 bearer function for the mobile station UE (or an S1 bearer function for the relay node RN) configured to set an S1 bearer for the mobile station UE (S1 bearer for the relay node RN) "(UE) S1 bearer (=(RN) S1 bearer)" with the radio base station eNB.

The mobile communication system according to the present embodiment realizes a configuration in which the mobile station is enabled to transmit/receive a data signal with the gateway device S-GW via an apparatus provided with a plurality of radio base station eNB functions (a relay node RN and a radio base station eNB) without executing a large modification of the protocol stack used in an LTE-scheme mobile communication system.

The mobile communication system according to the present embodiment enables a reduction in the overhead between the gateway device S-GW and the radio base station eNB.

The mobile communication system according to the present embodiment does not require to set the wired bearers to correspond to the number of mobile stations UE between the rely node RN and the radio base station eNB.

The mobile communication system according to the present embodiment enables performance of QoS control for each mobile station between the relay node RN and the radio base station eNB.

(Mobile Communication System according to Fifth Embodiment of Present Invention}

A mobile communication system according to the fifth embodiment of the present invention will be described with reference to FIG. 6. Hereinafter, the description of the mobile communication system according to the fifth embodiment of the present invention will concentrate on the points of difference from the mobile communication system according to the first embodiment described above.

Figure 6:
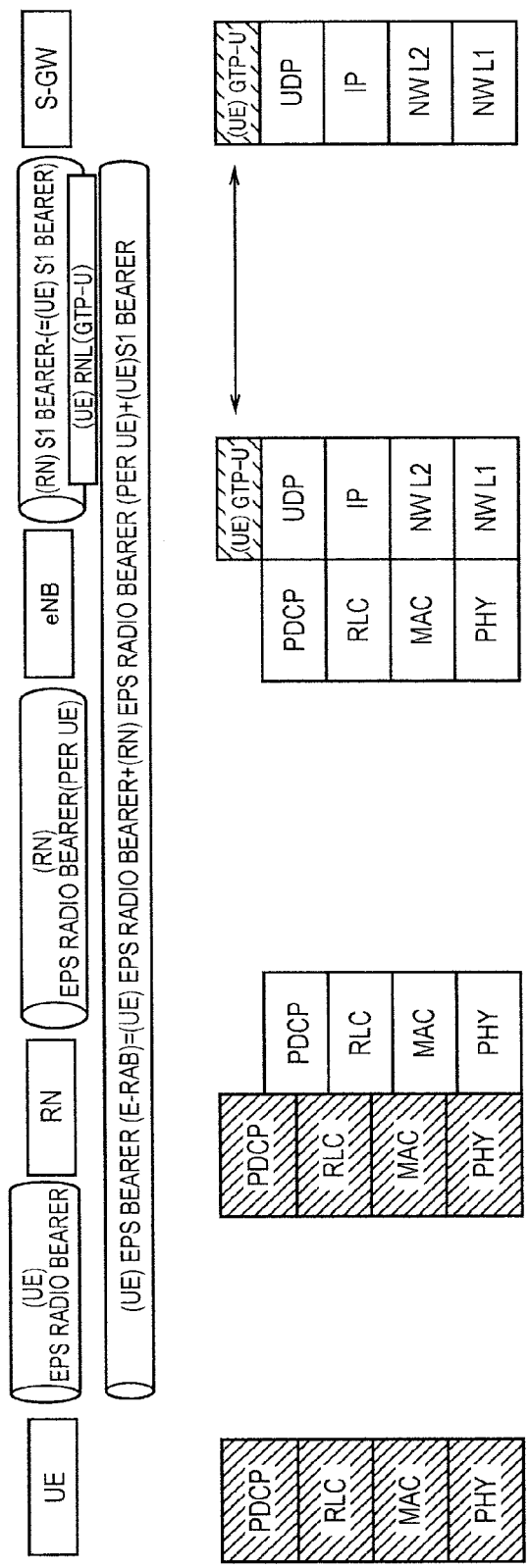
FIG. 6 illustrates a protocol stack in the mobile communication system according to a fifth embodiment of the present invention.
Figure 7:
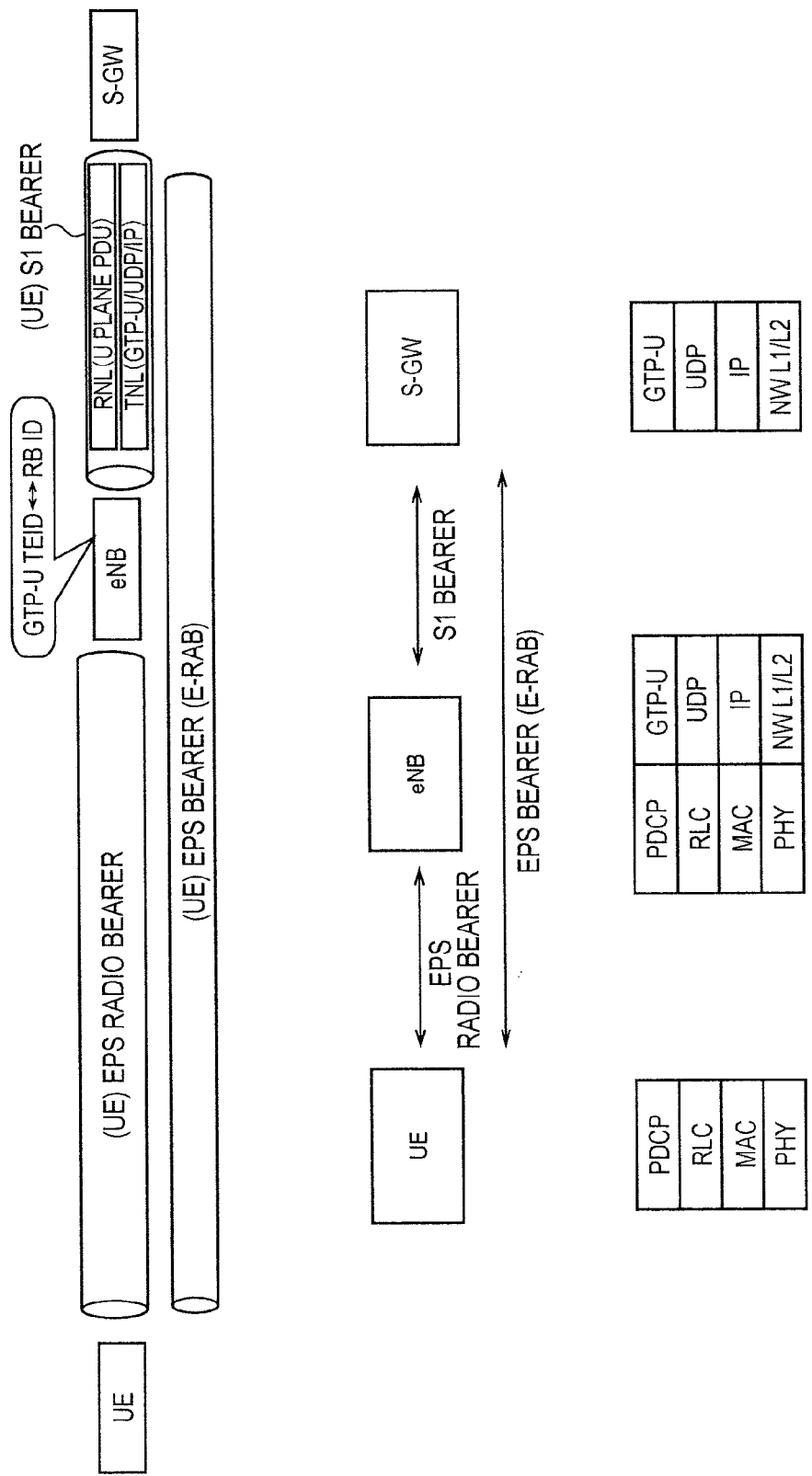
FIG. 7 illustrates a protocol stack in a current mobile communication system.

As illustrated in FIG. 6, the mobile communication system according to the present embodiment is configured so that transmitting and receiving of a data signal between a mobile station UE and a gateway device S-GW is enabled via a relay node RN and a radio base station eNB.

The mobile communication system according to the present embodiment is configured to set an EPS radio bearer for the mobile station UE "(UE) EPS radio bearer" between the mobile station UE and the relay node RN.

The mobile communication system according to the present embodiment is configured to set an EPS radio bearer for the relay node RN "(RN) EPS radio bearer (per UE)" independently for each mobile station between the radio base station eNB and the relay node RN.

The mobile communication system according to the present embodiment is configured to set an S1 bearer for the relay node RN "(RN) S1 bearer (=(UE) S1 bearer)" independently for each mobile station between the gateway device S-GW and the radio base station eNB.

As a result, the mobile communication system according to the present embodiment is configured so that data signals are transmitted/received between the gateway device S-GW and the mobile station UE via the EPS bearer for the mobile station UE (E-RAB) "(UE) EPS bearer" that is configured by the EPS radio bearer for the mobile station UE "(UE) EPS radio bearer", the EPS radio bearer for the relay node RN "(RN) EPS radio bearer (per UE)" set as for the mobile station UE, and the S1 bearer for the relay node RN "(RN) (=(UE) S1 bearer)" set as for the mobile station UE.

As illustrated in FIG. 6, the relay node RN includes an EPS radio bearer function for the mobile station UE configured to set an EPS radio bearer for the mobile station UE "(UE) EPS bearer" with the mobile station UE, and an EPS radio bearer function for the relay node RN configured to set an EPS radio bearer for the relay node RN "(RN) EPS radio bearer (per UE)" independently for each mobile station with the radio base station eNB.

The relay node RN is provided with EPS radio bearer functions for the mobile station UE including a physical (PHY) layer function, an MAC layer function provided as a higher layer function to the physical (PHY) layer function, an RLC layer function provided as a higher layer function to the MAC layer function, and a PDCP layer function provided as a higher layer function to the RLC layer function.

The relay node RN is provided with EPS radio bearer functions for the relay node RN including a physical (PHY) layer function, an MAC layer function provided as a higher layer function to the physical (PHY) layer function, an RLC layer function provided as a higher layer function to the MAC layer function, and a PDCP layer function provided as a higher layer function to the RLC layer function.

The radio base station eNB includes an EPS radio bearer function for the relay node RN configured to set the EPS radio bearer for the relay node RN "(RN) EPS radio bearer (per UE)" independently for each mobile station with the relay node RN, a wired bearer function configured to set a wired bearer with the gateway device S-GW, an IP layer function provided as a higher layer function to the wired bearer function, a UDP layer function provided as a higher layer function to the IP layer function, and a (UE) GTP-U layer function provided as a higher layer function to the UDP layer function.

The radio base station eNB is provided with EPS radio bearer functions for the relay node RN including a physical (PHY) layer function, an MAC layer function provided as a higher layer function to the physical (PHY) layer function, an RLC layer function provided as a higher layer function to the MAC layer function, and a PDCP layer function provided as a higher layer function to the RLC layer function.

The radio base station eNB is provided with a wired bearer function including a network layer 1/2 (NW L1/L2) function.

The (UE) GTP-U layer function for the radio base station eNB is an S1 bearer function for the mobile station UE (or an S1 bearer function for the relay node RN) configured to set an S1 bearer for the mobile station UE (S1 bearer for the relay node RN) "(UE) S1 bearer (=(RN) S1 bearer)" with the gateway device S-GW.

The gateway device S-GW includes a wired bearer function configured to set a wired bearer with the radio base station eNB, an IP layer function provided as a higher layer function to the wired bearer function, a UDP layer function provided as a higher layer function to the IP layer function, and a (UE) GTP-U layer function provided as a higher layer function to the UDP layer function.

The gateway device S-GW is provided with a wired bearer function including a network layer 1/2 (NW L1/L2) function.

The (UE) GTP-U layer function for the gateway device S-GW is an S1 bearer function for the mobile station UE (or an S1 bearer function for the relay node RN) configured to set an S1 bearer for the mobile station UE (S1 bearer for the relay node RN) "(UE) S1 bearer (=(RN) S1 bearer)" with the radio base station eNB.

The mobile communication system according to the present embodiment realizes a configuration in which the mobile station is enabled to transmit/receive a data signal with the gateway device S-GW via an apparatus provided with a plurality of radio base station eNB functions (a relay node RN and a radio base station eNB) without executing a large modification of the protocol stack used in an LTE-scheme mobile communication system.

The mobile communication system according to the present embodiment enables a reduction in the overhead between the gateway device S-GW and the radio base station eNB.

The mobile communication system according to the present embodiment enables performance of QoS control for each mobile station between the relay node RN and the radio base station eNB.

Note that operation of the above described the mobile station UE, the relay node RN, the radio base station eNB and the mobile switching center MME may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE, the relay node RN, the radio base station eNB and the mobile switching center MME. Also, the storage medium and the processor may be provided in the mobile station UE, the relay node RN, the radio base station eNB and the mobile switching center MME as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication system configured to transmit and receive a data signal between a mobile station and a gateway device via a relay node and a radio base station, the mobile communication system comprising: a processor; a memory operatively connected to the processor; a radio bearer for the mobile station set between the mobile station and the relay node; a radio bearer for the relay node set between the relay node and the radio base station; an Evolved Packet System (EPS) bearer for the mobile station set between the mobile station and the gateway device, wherein the EPS bearer for a plurality of mobile stations is multiplexed in the radio bearer for the relay node; a S1 bearer set between the radio base station and the gateway device without setting the S1 bearer between the relay node and the gateway device, wherein the S1 bearer is set independently for each mobile station; and the data signal is transmitted by the processor and received between the mobile station and the gateway device via the radio bearer for the mobile station, the EPS bearer for the mobile station, and the S1 bearer set as for the mobile station.

2. The mobile communication system of claim 1, wherein quality of service (QoS) control between the relay node and the radio base station is performed.

* * * * *